(12) United States Patent
Drori et al.

(10) Patent No.: US 11,526,422 B2
(45) Date of Patent: Dec. 13, 2022

(54) SYSTEM AND METHOD FOR TROUBLESHOOTING ABNORMAL BEHAVIOR OF AN APPLICATION

(71) Applicant: BMC Software, Inc., Houston, TX (US)

(72) Inventors: Eynan Drori, Kibbutz Hulata (IL); Sudhir Sangra, Pune (IN)

(73) Assignee: BMC Software, Inc., Houston, TX (US)

( * ) Notice: Subject to any disclaimer, the term of this patent is extended or adjusted under 35 U.S.C. 154(b) by 310 days.

(21) Appl. No.: 16/730,043

(22) Filed: Dec. 30, 2019

(65) Prior Publication Data

US 2021/0149789 A1  May 20, 2021

(30) Foreign Application Priority Data

Nov. 18, 2019  (IN) .............................. 201941046842

(51) Int. Cl.
*G06F 11/00* (2006.01)
*G06F 11/36* (2006.01)
*G06F 16/23* (2019.01)

(52) U.S. Cl.
CPC ...... *G06F 11/3612* (2013.01); *G06F 11/3616* (2013.01); *G06F 16/2379* (2019.01)

(58) Field of Classification Search
CPC ............. G06F 11/3612; G06F 11/3616; G06F 11/3409; G06F 11/3466
See application file for complete search history.

(56) References Cited

U.S. PATENT DOCUMENTS

| | | |
|---|---|---|
| 6,738,933 B2 | 5/2004 | Fraenkel et al. |
| 7,502,844 B2 | 3/2009 | Garg et al. |
| 7,624,174 B2 | 11/2009 | Sanghvi et al. |
| 7,673,189 B2 | 3/2010 | Duyanovich et al. |
| 8,862,728 B2 | 10/2014 | Jayachandran et al. |
| 9,419,917 B2 | 8/2016 | Eaton et al. |
| 9,516,053 B1 | 12/2016 | Muddu et al. |
| 10,055,275 B2 | 8/2018 | Razin et al. |

(Continued)

OTHER PUBLICATIONS

Torres, et al, "Inferring Undesirable Behavior from P2P traffic Analysis", Purdue University, Jan. 2008, retrieved from https://docs.lib.purdue.edu/ecetr/378/, 13 pages.

*Primary Examiner* — Amine Riad
(74) *Attorney, Agent, or Firm* — Brake Hughes Bellermann LLP (57) ABSTRACT

A method for troubleshooting abnormal behavior of an application hosted on a networked computer system. The method may be implemented by a root cause analyzer. The method includes tracking a single application performance metric across all the clients of an application hosted on a networked computer system and analyzing an aggregated application based on the single application metric. The method involves determining outlier client attributes associated with an abnormal transaction of the application and ranking the outlier client attributes based on comparisons of historical and current abnormal transactions. The method associates one or more of the ranked outlier client attributes with the root cause of the current abnormal transaction. Association rule learning is used to associate one or more of the ranked outlier client attributes with the root cause.

18 Claims, 6 Drawing Sheets

(56) References Cited

U.S. PATENT DOCUMENTS

| | | |
|---|---|---|
| 10,223,644 B2 | 3/2019 | Gadde et al. |
| 10,356,106 B2 | 7/2019 | Engel et al. |
| 2007/0220371 A1* | 9/2007 | Duyanovich ....... G06F 11/3485 |
| | | 714/49 |
| 2009/0177692 A1 | 7/2009 | Chagoly et al. |
| 2021/0406148 A1* | 12/2021 | Bertran ................ G06F 11/328 |
| 2022/0036264 A1* | 2/2022 | Kearns ................... G06N 20/00 |

* cited by examiner

Set of Historical Abnormal Transactions

SYSTEM AND METHOD FOR TROUBLESHOOTING ABNORMAL BEHAVIOR OF AN APPLICATION

CROSS-REFERENCE TO RELATED APPLICATION

This application claims priority to Indian Provisional Application No. 201941046842, filed on Nov. 18, 2019, the disclosure of which is incorporated by reference herein in its entirety.

TECHNICAL FIELD

This description relates to networked computer systems and computer resources that provide cloud or on-premise computing platforms for executing applications.

BACKGROUND

Modern information technology (IT) infrastructure includes networked computer systems that can make shared computer resources (servers, databases, network components, browsers, end-user devices, etc.) available to host an application for different end-users. For example, a banking application hosted on a networked computer system (e.g., on-premise or a cloud computing platform) may be used by different bank clients to conduct banking transactions via a web interface on local client devices.

Information technology operations management (ITOM) involves managing the provisioning, capacity, cost, performance, security, and availability of Information Technology (IT) infrastructure and services including on-premises data centers, private cloud deployments, and public cloud resources. An important responsibility of ITOM is to configure and maintain the IT infrastructure for proper application performance for the end-users under changing circumstances.

Bugs, malware, incorrect or insufficient implementation of application lifecycle, memory related issues, or any of a number of hardware, software or network weaknesses (e.g., error, flaw, failure or fault) in the IT infrastructure may cause abnormalities in performance (e.g., bad usability, non-responsive, crashes, and even data loss) of the application across the different end-users. Root cause analysis of abnormalities in application performance can help in quick identification and preventative remediation of the abnormalities in application performance.

Consideration is now being given to detection of and root cause analysis of abnormal application behavior for applications that run on a cloud or an on-premise computing platform.

SUMMARY

In a general aspect, a method for root cause analysis of an application performance abnormality in a networked computer system includes selecting an application performance metric, collecting client transactions data for transactions conducted by clients using the application on the networked computer system, and aggregating the client transactions data for the metric. The method further includes filtering the client transactions data to identify a set of abnormal transactions, finding a set of frequently-appearing independent attributes that appear in the set of abnormal transactions at a higher frequency not appearing in a historical set of normal transactions, and finding outlier attributes within the set of frequently-appearing independent abnormal attributes using historical normal transactions data as reference, and pinpointing a root cause for the abnormal event based on the outlier attributes.

The details of one or more implementations are set forth in the accompanying drawings and the description below. Other features will be apparent from the description and drawings, and from the claims.

BRIEF DESCRIPTION OF THE DRAWINGS

Throughout the figures, the same reference numerals and characters, unless otherwise stated, are used to denote like features, elements, components, or portions of the illustrated embodiments.

DETAILED DESCRIPTION

Systems and methods for root cause analysis (RCA) of abnormalities in performance of an application hosted on a networked computer system are disclosed herein.

Figure 1:
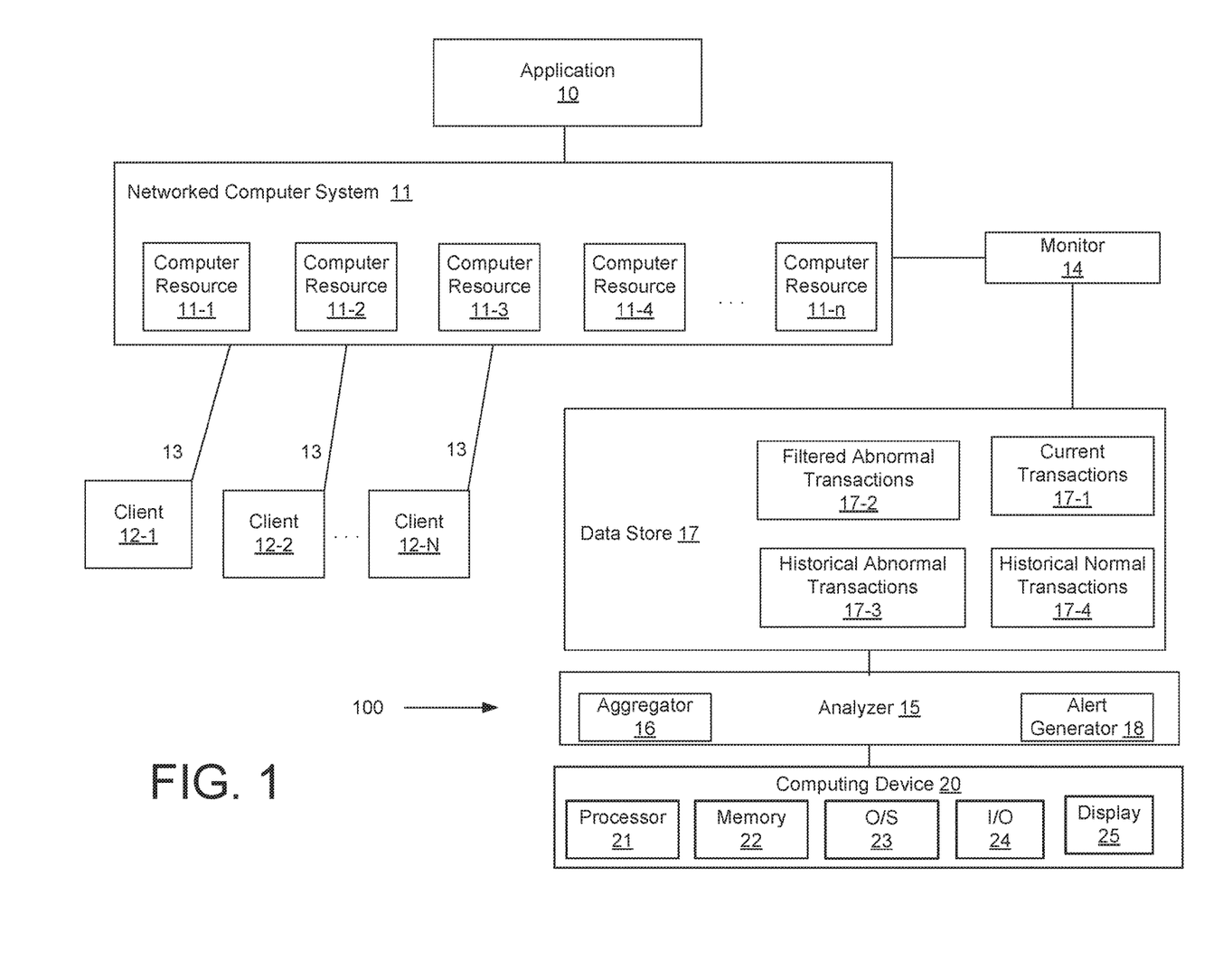
FIG. 1 is a schematic illustration of an example system that includes an analyzer configured for root cause analysis (RCA) of abnormalities in performance of an application hosted on a networked computer system, in accordance with the principles of the present disclosure.

FIG. 1 illustrates an example system 100 that includes an analyzer 15 configured for root cause analysis (RCA) of abnormalities in performance of an application (e.g., application 10) hosted on a networked computer system (e.g., networked computer system 11). Analyzer 15 may be hosted, for example, on one or more physical or virtual computers (e.g., a computing device 20) and may include an aggregator 16 and an alert generator 18. Computing device 20 may, for example, include a processor 21, a memory 22, an 0/S 23, an input/output port (I/O) 24 and a display 25.

Networked computer system 11 (e.g., a public cloud, a private cloud, or an on-premise system) can provide a platform for executing applications (e.g., application 10) as an application service to multiple clients (i.e., end-users). Networked computer system 11 may include a plurality of computer resources (e.g., computer resources 11-1, 11-2, 11-3, 11-4, . . . , 11-*n*, etc.) including, for example, one or more servers (e.g., web servers, application servers, etc.), databases, software code, network components, other applications, and services. In example cloud implementations of networked computer system 11, the plurality of computer resources can include thousands of servers and interconnected cloud resources.

Application 10 may, for example, be any application (e.g., a web-based e-commerce retail application, a printing service application, a banking transactions application, etc.) that can be utilized by multiple clients. Application 10 may, be provided as an application service to multiple clients (e.g., clients 12-1, 12-2, . . . , 12-N, etc.) by networked computer system 11. The clients (e.g., clients 12-1, 12-2, etc.) on respective computing devices (not shown) may operate or access functions of application 10 hosted on networked computer system 11 via network connections 13.

An application transaction is a sequence of user (client) and system activities or operations that can be viewed as a logical unit of work. As an example, in the case of an e-commerce retail shopping application, application transactions that a client can perform include transactions such as adding an item to a cart ("addCart"), viewing items in a cart ("ViewCart'), making a payment ("MakePayment"), etc.

Each application transaction in an instance of execution of the application may be characterized by a set of specific conditions (i.e., attributes) of the networked computer system and of the client's computing devices. The specific conditions may be described, for example, by attributes such as the location, Transmission Control Protocol/Internet Protocol (TCP/IP), browser type, customer identification (id), and Uniform Resource Locator (URL) used in the instance of application execution.

A monitor (e.g., monitor 14) may be coupled to networked computer system 11 to detect, and report on performance of applications (e.g., application 10) hosted on the networked computer system. Monitor 14 may, for example, be a commercially available application performance detection and reporting system (e.g., BMC TrueSight Operations, etc.) that can automatically detect, and report on application performance in networked computer systems. Monitor 14 may monitor and measure, for example, any number of client-specific conditions and metrics (e.g., page load, response time, number of calls made by the application, etc.) for transactions made in application execution. The application performance metrics may have numeric values. Monitor 14 may also monitor and collect the specific conditions (i.e., attributes with non-numeric values) of the networked computer system and of the client's computing devices for each transaction. A specific set of attributes may correspond to a specific infrastructure condition (i.e., client computing device condition and networked computer system condition) for each transaction.

To keep the application working properly for different clients of the application service, it is important to detect and troubleshoot abnormalities in application performance on the networked computer system, and to further determine the proximate causes of the abnormalities. Quick and accurate determination of the proximate causes of the abnormalities may enable timely remedial actions (e.g., reconfiguration, repair, or correction of the networked computer system) to ensure proper functioning of the application.

For this purpose, analyzer 15 may be coupled to networked computer system 11 on which application 10 is hosted, and to a data store (e.g., data store 17). Data store 17 may include data on application transactions (e.g., current transactions 17-1, filtered abnormal transactions 17-2, historical abnormal transactions 17-3, and historical normal transactions 17-4, etc.).

For troubleshooting abnormal behavior of the application, a first step is to identify an occurrence of abnormal behavior. Abnormal behavior may be deemed to occur, for example, whenever a measured application performance metric for a transaction crosses a predetermined threshold value (e.g., average value). Troubleshooting may involve identifying the specific infrastructure condition (i.e., the attribute or attributes) associated with the abnormal behavior. For troubleshooting the behavior of each instance of the application transaction executed by different end-users in common networked computer systems, it may be necessary to set up a large number (e.g., hundreds or even thousands) of threshold rules for the client-specific application performance metrics (e.g., page load, response time, number of calls made by the application, etc.) for application functions or transactions. The threshold rules may be based on an attribute or combination of attributes (e.g., location, Internet Protocol address (IP), browser, customer id, URL, etc.). Setting up the threshold rules requires prior knowledge of each client's attributes and manually creating client specific rules. With tens or even hundreds of clients of an application service, it can be impractical to choose which application performance metrics are relevant, to look at the related attributes, or to perform the runtime aggregation of specific attributes to identify which client attribute or attributes are a cause of the abnormal behavior. Further, the networked computer systems may present ever-changing environments (e.g., on-premise or cloud platforms) in which the application is executed. It is impractical to manage the large number of manually-created threshold rules and difficult to keep rules current in the ever-changing environments. Traditional troubleshooting relies on statistical analysis of the transaction metrics associated with the abnormal instances of application execution and requires manually defining instances as a combination of attributes. The traditional statistical analysis can only probabilistically identify the client attribute or combination of the client attributes associated with the abnormal behavior.

The traditional troubleshooting techniques have several drawbacks including (a) generation of multiple events leading to event noise, and (b) a need for coding and managing a large set of rules. These drawbacks can lead to significant time being spent in finding the root cause of degraded application performance and delay remediation. The delay can result in violation of service level agreements with the clients that can result in financial penalties on the application service provider.

The disclosure herein provides systems and methods (collectively "solutions") that track only a single aggregated application metric (e.g., page load, response time, or number of API calls, etc.) across all the clients (e.g., thousands or millions of visitors to a website) of an application and perform root cause analysis based on the single aggregated application metric to determine the client attributes or combination of client attributes (such as location, URL, browser type, etc.) experiencing the abnormal behavior.

In example implementations, the solutions for root cause analysis of the abnormal behavior may utilize behavioral learning on an aggregated view of the application (based on the single aggregated application metric) to identify one or more outlier client attributes associated with an abnormal transaction. The solutions may further involve ranking the outlier client attributes as possible causes of the abnormality. Association rule learning may be used to identify one or more of outlier client attributes as causes of the abnormal transaction.

The clients' attributes are dynamic in nature, and the number of attributes may be expected to increase or decrease based on, for example, the configuration and other factors of the clients. The single aggregated application metric utilized to monitor application behavior across all the clients of the application (e.g., application 10) may be defined without the prior knowledge of the clients' attributes. Application behavior in context of the clients utilizing the application may be analyzed with reference to the single aggregated application metric without performing runtime aggregations of behaviors across the clients' attributes.

Figure 2:
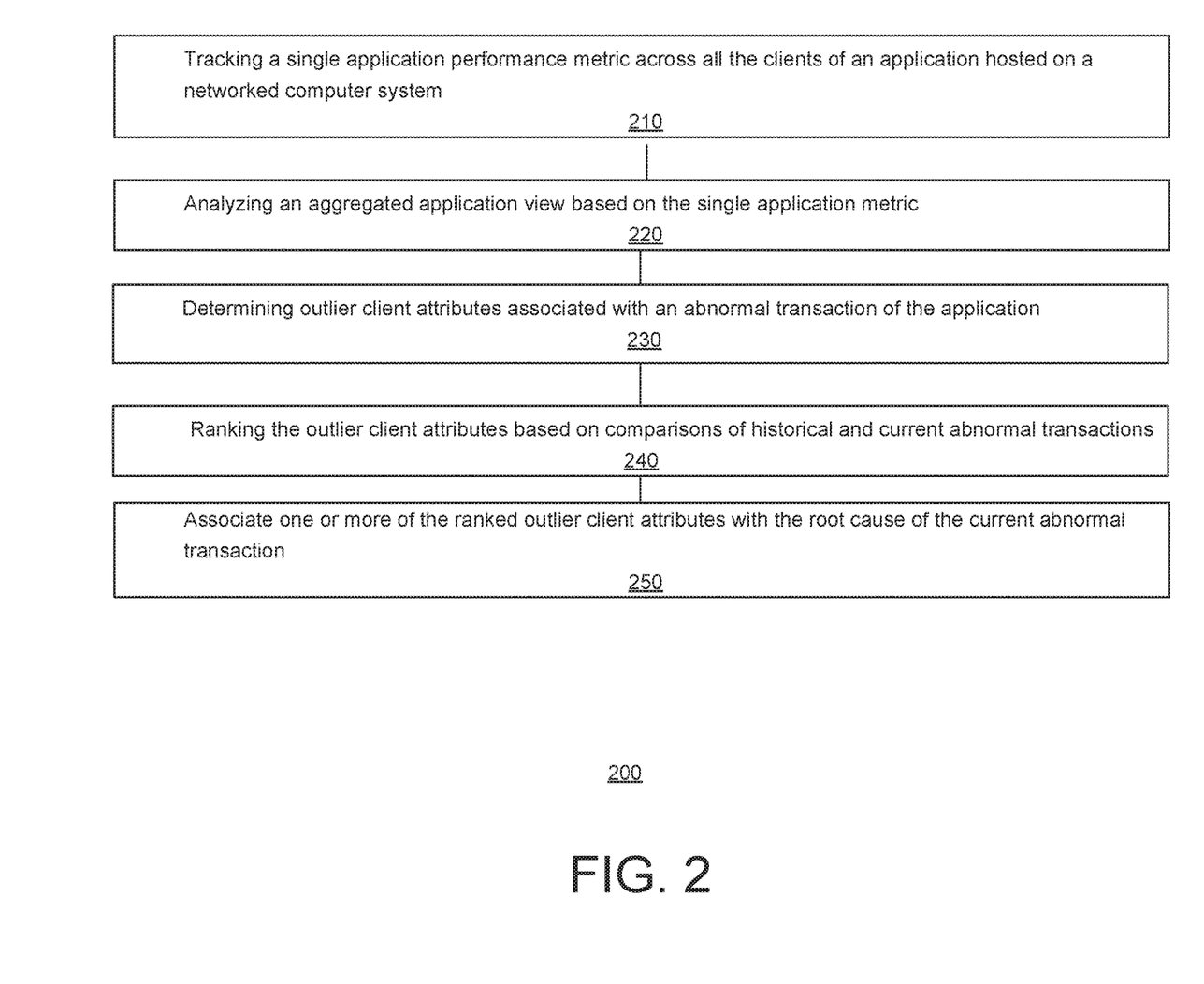
FIG. 2 illustrates an example method for troubleshooting abnormal behavior of an application, in accordance with the principles of the present disclosure.

FIG. 2 illustrates an example method 200 for troubleshooting abnormal behavior of an application. Method 200 may be implemented by using the processes of analyzer 15 (FIG. 1).

Method 200 includes tracking a single application performance metric across all the clients of an application hosted on a networked computer system (210); analyzing an aggregated application view based on the single application metric (220); determining outlier client attributes associated with an abnormal transaction of the application (230); ranking the outlier client attributes based on comparisons of historical and current abnormal transactions (240); and associating one or more of the ranked outlier client attributes with the root cause of the current abnormal transaction (250). Association rule learning may be used to associate one or more of the ranked outlier client attributes with the root cause of the current abnormal transaction.

Figure 3:
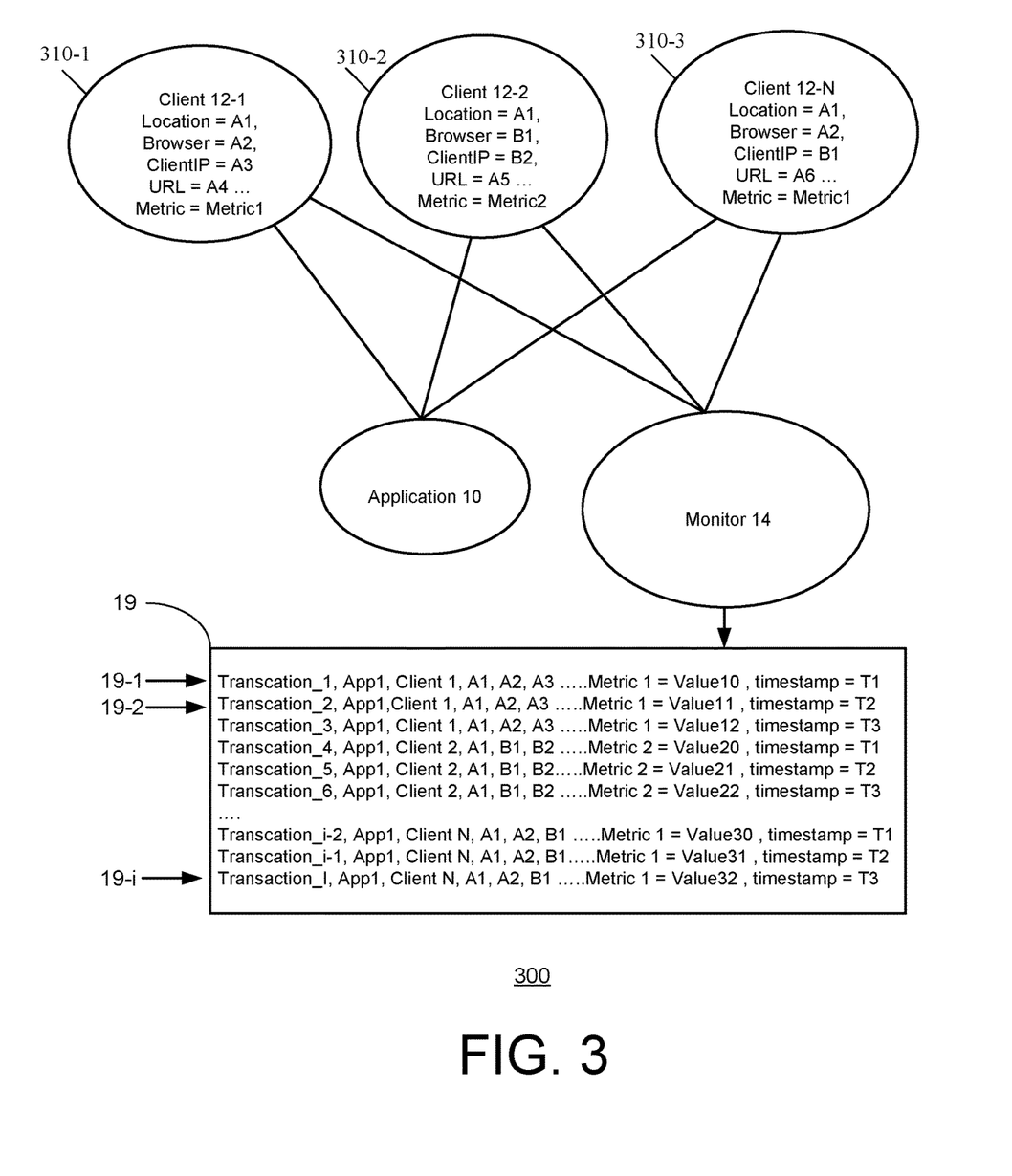
FIG. 3 is a schematic representation of data that may be collected for root cause analysis of application abnormalities, in accordance with the principles of the present disclosure.

FIG. 3 shows a schematic representation 300 of data that may be collected by monitor 14 for root cause analysis of application abnormalities (e.g., by analyzer 15). When clients (e.g., clients 12-1, 12-2, . . . 12-N, etc.) conduct application transactions utilizing application 10, the clients may self-record data (e.g., data 310-1, 310-2, 310-3, etc.) that includes client-specific attributes and the application performance metrics (e.g., metric1, metric2, etc.) associated with the transactions. Data 310-1 for client 12-1 may, for example, include client-specific attributes: Location=A1, Browser=A2, ClientIP=A3, URL=A4 . . . ; and Metric=Metric1); data 310-2 for client 12-1 may, for example, include client-specific attributes: Location=A1, Browser=B1, ClientIP=B2, URL=A5 . . . ; and Metric=Metric2); and data 310-3 for client 12-N may, for example, include client-specific attributes: Location=A1, Browser=A2, ClientIP=B1, URL=A6 . . . ; and Metric=Metric1); etc.

Monitor 14 may receive or collect the data (e.g., data 310-1, 310-2, 310-3, etc.) and assemble the data, for example, as time-stamped records 19 of the transactions. Records 19 may, for example, include respective time stamped records (e.g. records 19-1, 19-2, . . . , 19-$i$) for each of transaction (e.g., transactions 1 to i) conducted by the clients over a period of time. Each time-stamped record (e.g. records 19-1, 19-2, . . . , 19-$i$) may, for example, include an identification of the transaction, an identification of the application, and an identification of the client, and values of the client-specific attributes, the application performance metric and the transaction time associated with the transaction. Monitor 14 may store records 19 in a data store (e.g., as current transactions 17-1 in data store 17) or otherwise supply records 19 to analyzer 15 for use in root cause analysis of abnormal transactions. Records 19 represent data collected in a client context, where the context is defined by the client-specific attributes. The data in each record is tagged with the identification of the application and is stored along with the application performance metric for a transaction.

Analyzer 15 may include definitions of one or more aggregated application performance metrics (e.g., Metric1, and Metric2) for use as a single aggregated application metric for root cause analysis of abnormal transactions. The definition of the aggregated application performance metrics for the application (e.g., application 10) may be made (e.g., by an information technology operations manager (ITOM) operator or administrator) without the prior knowledge of the attributes of the clients. An aggregator (e.g., aggregator 16) in analyzer 15 may aggregate the data (that has been captured in client context without the client attributes) in an application view (e.g., Aggregated_App1_metric1, Aggregated_App1_metric2) defined by the aggregated application performance metrics (e.g., Metric1, and Metric2) as illustrated by a snippet of pseudocode as shown below:

Aggregated_App1_metric1: App1-Metric 1 (Metric1 across all the clients connecting to App1)

Aggregated_App1_metric2: App1-Metric 2 (Metric2 across all the clients connecting to App1).

Further, analyzer 15 may determine baseline values for the aggregated application performance metrics (e.g., Metric1, and Metric2) in the networked computer system, for example, by averaging metric values over a period of time. An alert generator (e.g., alert generator 18) may generate an alert when a baseline violation of a metric (e.g., Metric1) occurs (e.g., at time T2). The baseline violation may be indicative of occurrence of an abnormal transaction. An example alert may read as follows:

Alert on "Aggregated_App1_metric1", violation of the <baseline>@ T2

Figure 4:
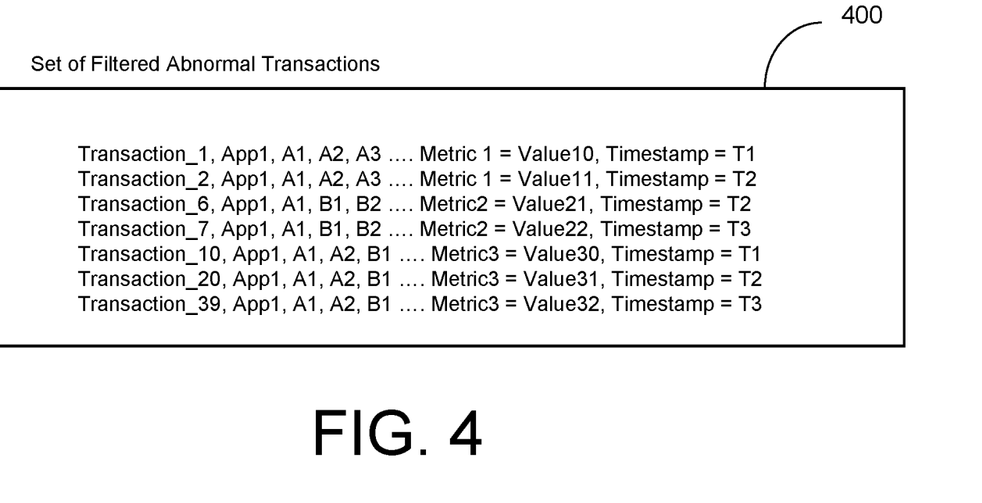
FIG. 4 is an illustration of an example set of the filtered abnormal transaction records, in accordance with the principles of the present disclosure.

Next, analyzer 15 may consume the alert and use the alert context (e.g., time, application name, and metric name) to filter records of transactions occurring in a time interval about time T2 (e.g., T2±delta) that have metric values that violate the baseline values to generate a set of filtered abnormal transaction records (e.g., filtered abnormal transactions 17-2). These filtered transaction records are associated with abnormal transactions. The filtered abnormal transaction records may, for example, include a number N of the records. An example record may have a format: (transaction ID, application ID, list of client-specific attributes and values (e.g., Location=A1, Browser=A2, etc.), metric ID and value, and a time stamp of the transaction). FIG. 4 shows an example set of the filtered abnormal transaction records (e.g., set 400).

Next, analyzer 15 may determine a frequency of occurrence of (i.e., support for) each client attribute (e.g., Location=A1, Browser=A2, etc.) in the set of filtered abnormal transaction records. In an example implementation, the frequency of occurrence of (or support for) an example client attribute X is given by the number of transaction records that include the attribute X divided by a number N of all transaction records in the set of filtered abnormal transactions.

Figure 5:
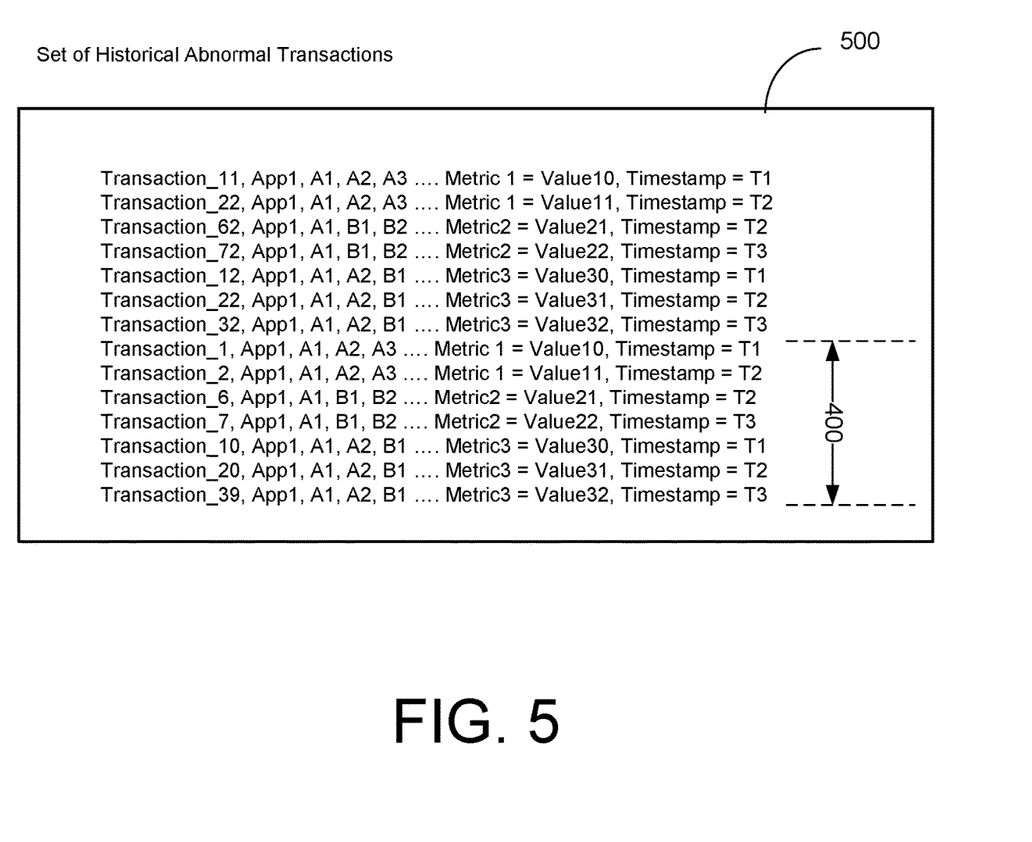
FIG. 5 is an illustration of the set of filtered abnormal transactions (FIG. 4) being added to a list of historical abnormal transactions, in accordance with the principles of the present disclosure.

The set of filtered abnormal transactions 400 may be added to a list of historical abnormal transactions (e.g., historical abnormal transactions 17-3). FIG. 5 shows an example set (e.g., set 500) of historical abnormal transactions to which set 400 is added.

Next, analyzer 15 may identify outlier attributes in the set of the filtered abnormal transaction records (e.g., set 400) by comparison with historical normal transactions data (e.g., historical normal transactions 17-4). The historical normal transactions data may correspond to a time period (e.g., a previous day, week, or month) during which the networked computer system was performing normally with no baseline violation being generated for the application aggregated metric. Analyzer 15 may determine a normal frequency of occurrence of each client attribute (e.g., Location=A1, Browser=A2, etc.) in the historical normal transactions data.

Analyzer 15 may identify one or more outlier attributes in the set of filtered abnormal transaction records (e.g., filtered abnormal transactions 17-2) by comparing the frequency of occurrence of each client attribute in the set of filtered abnormal transaction records and the normal frequency of occurrence of each client attribute in the historical normal transactions data (e.g., historical normal transactions 17-4).

Analyzer 15 may further rank the identified outlier attributes in the set of filtered abnormal transaction records. The rank assigned to an outlier attribute may be based on a confidence (or support) value. In example implementations, the confidence value may be based on the frequency of occurrence of the outlier attribute (e.g., attribute Y) in historical abnormal transactions including the current set of abnormal transactions. FIG. 5 shows an example set (e.g., set 500) of historical abnormal transactions including the current set of abnormal transactions. In an example implementation, the frequency of occurrence of an example outlier attribute Y is given by the number of transaction records that include the attribute Y divided by the number M of transaction records in the set of filtered abnormal transactions (e.g., set 500).

Figure 6:
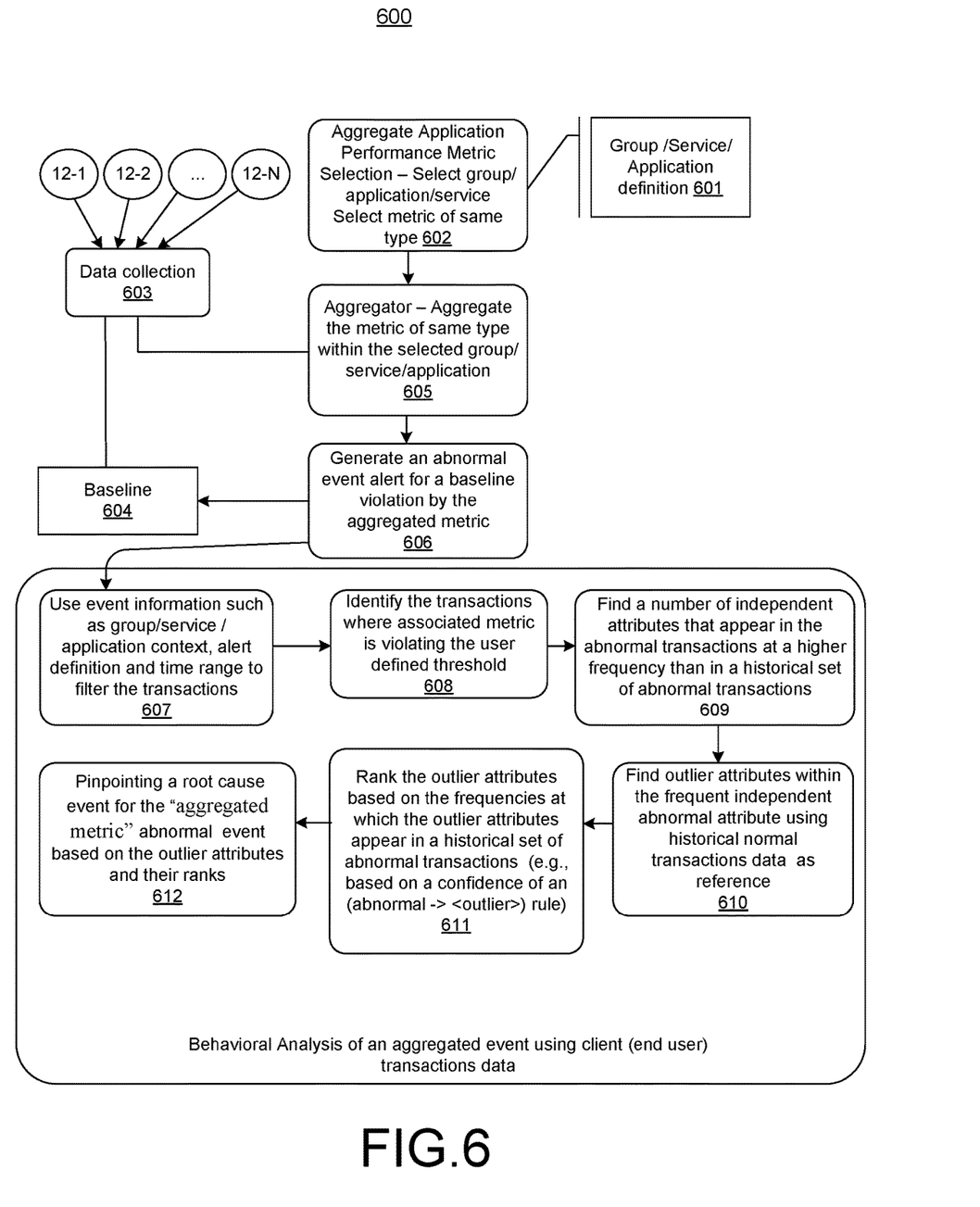
FIG. 6 is an illustration of an example method or root cause analysis of application performance abnormalities in a networked computer system hosting an application for multiple clients, in accordance with the principles of the present disclosure.

FIG. 6 schematically shows an example method 600 for root cause analysis of application performance abnormalities in a networked computer system hosting an application for multiple clients. The application (e.g., application 10) may be provided by the networked computer system (e.g. networked computer system 11) to multiple clients (e.g., clients 12-1, 12-2, . . . , 12-N). The application may be part of a group of applications or an application service hosted on the networked computer system.

Method 600 includes referring to a definition of a group, a service, or an application to be considered for root cause analysis of application performance abnormalities (601); and selecting an aggregate application performance metric (602). Defining the aggregate application performance metric may include selecting a particular group, service, or application for root cause analysis of performance abnormalities and selecting a same type of metric within the selected group, service, or application.

Method 600 also includes collecting data (e.g., application performance data, and client specific conditions) (603) for client transactions conducted using the application on the networked computer system (11) and establishing baseline metrics data (604). The baseline metrics data may be established, for example, by averaging the data over a period of normal performance of the application.

Method 600 further includes aggregating the data for the metric of same type within the selected group, service, or application (605); and generating an abnormal event alert for a baseline violation by the aggregated metric (606).

Method 600 further includes behavioral analysis of the abnormal event using client transactions data for root cause analysis (RCA) of the abnormality. For example, method 600 further includes using event information (such as group/service/application context, alert definition, and time range) to filter the client transactions data (607), and filtering the client transactions data to identify transactions (i.e., a current set of abnormal transactions) where the associated metric is violating a user defined threshold (608). Method 600 may further include finding a number of independent attributes that appear in the current set of abnormal transactions at a higher frequency (609), and finding outlier attributes within the frequent independent abnormal attributes using historical normal transactions data as reference (610). The historical normal transactions data may be data that extends over a time period, for example, a day, a week, or a month.

Method 600 may further include ranking the outlier attributes based on the frequencies at which the outlier attributes appear in a historical and a current set of abnormal transactions (611) (e.g., based on a confidence of an (abnormal→<outlier>) rule), and pinpointing a root cause event for the abnormal "aggregated metric" event based on the outlier attributes and their ranks (612).

The behavioral analysis in method 600 for root cause analysis (RCA) of the abnormal event (e.g., steps 607-612) may include using frequent item techniques of data mining methods to establish support and confidence using boolean association rules to identify frequently occurring attributes associated with the abnormal event.

Example Scenario

As an example of implementation of the foregoing solutions for root cause analysis of application performance abnormalities, consider an example scenario of an application (e.g., application 10) hosted on a networked computer system (e.g., networked computer system 11) for which performance data is collected (e.g., by monitor 14) and stored in a data store (e.g., data store 17). In this example, data entities (e.g., transaction records) may be identified based on the attribute set during data collection. The attribute set may contain both client-specific contextual attributes and application performance metrics (e.g., numeric attributes). An entity may have a key/value structure for both contextual attributes and metrics (numeric attributes).

In this example, a metric: Page Load, may, for example, be selected as the single aggregated application metric utilized to monitor application behavior across all the clients of the application. An aggregated metric alert for an abnormal transaction may be defined by the following pseudo-code:

If metric_name="Page Load" and attributeList={[name=*, Value=*]} and average (10 min)>"3000" then generate the ALARM.

In the foregoing pseudocode, ten minutes may be a selected time range for aggregation of data (e.g., transactions 17-1 in data store 17) and 3000 may be a defined threshold value or a baseline value for the metric Page Load. An example aggregated metric ALARM generated (e.g., by alert generator 18) in response to the aggregated metric alert may be: metric_name="Page Load", average (10 min)="3242", indicating occurrence of an abnormal application transaction.

A next step in the root cause analysis may include, identifying the entities or components causing the alarm on the aggregated metric "Page Load". Analyzer 15 may identify a set of transactions records (e.g., in transactions 17-1 in data store 17) corresponding to metric name "Page Load." An example set of such transaction records (e.g., seven transaction records T1-T7) is shown in tabular form in TABLE A below. The transaction records T1-T7 may include values for client-specific attributes Browser, Server IP, Location, Screen resolution, and the metric Page Load.

TABLE A

| Transaction/ (attributes) | Browser | Server IP | Location | Screen resolution | Page Load |
|---|---|---|---|---|---|
| T1 | Chrome | 10.0.0.1 | U.S | 900 × 1918 | 6000 |
| T2 | Firefox | 10.0.0.2 | IL | 600 × 800 | 100 |

TABLE A-continued

| Transaction/ (attributes) | Browser | Server IP | Location | Screen resolution | Page Load |
|---|---|---|---|---|---|
| T3 | Chrome | 10.0.0.1 | IN | 900 × 1918 | 5000 |
| T4 | Firefox | 10.0.0.1 | IL | 900 × 1918 | 200 |
| T5 | Chrome | 10.0.0.1 | IN | 600 × 800 | 5000 |
| T6 | IE | 10.0.0.2 | U.S | 600 × 800 | 900 |
| T7 | Chrome | 10.0.0.1 | U.S | 900 × 1918 | 5500 |

It may be noted that of the seven transactions T1-T7 shown in TABLE A, four transactions T1, T3, T5 and T7 are abnormal transactions because their Page Load metric values exceed the baseline value 3000.

Analyzer 15 may further filter the set of transactions records shown in TABLE A to generate a set of filtered abnormal transactions (e.g., Filtered Abnormal Transactions 17-2, FIG. 1) as shown in TABLE B below.

TABLE B

| Transaction/ (attributes) | Browser | Server IP | Location | Screen resolution | Page Load |
|---|---|---|---|---|---|
| T1 | Chrome | 10.0.0.1 | U.S | 900 × 1918 | 6000 |
| T3 | Chrome | 10.0.0.1 | IN | 900 × 1918 | 5000 |
| T5 | Chrome | 10.0.0.1 | IN | 600 × 800 | 5000 |
| T7 | Chrome | 10.0.0.1 | U.S | 900 × 1918 | 5500 |

Analyzer 15 may determine that a frequent item set, i.e., frequent attributes, whose support (frequency) is greater than user selected threshold=40, which occur in the abnormal transactions include—Browser: Chrome, Server IP: 10.0.0.1 and Location: US, for example, with Support (browser: Chrome)=57%, Support (Server IP: 10.0.01) =71%, Support (Location: US)=42%

Analyzer 15 may further determine a frequency at which the independent frequent attributes (e.g., Browser: Chrome, Server IP: 10.0.01, and Location: US) appear in a historical set of normal transactions. TABLE C below shows a set of historical normal transactions (e.g., Historical Normal Transactions 17-3, FIG. 1) that includes attribute data, for example, for seven transactions Tx1-Tx7.

TABLE C

| Transaction/ (attributes) | Browser | Server IP | Location | Screen resolution | Page Load |
|---|---|---|---|---|---|
| Tx1* | Chrome | 10.0.0.3 | U.S | 900 × 1918 | 1000 |
| Tx2 | Firefox | 10.0.0.4 | IL | 600 × 800 | 100 |
| Tx3 | Chrome | 10.0.0.3 | IN | 900 × 1918 | 1000 |
| Tx4 | Firefox | 10.0.0.1 | IL | 900 × 1918 | 200 |
| Tx5 | Chrome | 10.0.0.2 | IN | 600 × 800 | 1100 |
| Tx6 | Chrome | 10.0.0.1 | U.S | 600 × 800 | 900 |
| Tx7 | Firefox | 10.0.0.2 | U.S | 900 × 1918 | 300 |

An average value for the metric Page Load in the historical normal data may, for example, be 657. TABLE C shows that entries (i.e., Tx1, Tx3, Tx5 and Tx6) have above average value for metric Page Load as per historical data and metric definition.

Analyzer 15 may further determine which attributes (e.g., Browser: Chrome, Server IP: 10.0.01, and Location: US) appear in the set of filtered normal transactions at a higher frequency (have support greater then user selected threshold=40). Analyzer 15 may for example find the attributes as follows: Support (Browser: Chrome)=57%.

Analyzer 15 may find a frequent attribute in the normal transactions is Browser: Chrome based on the user selected support (frequency) threshold. The analyzer may, for example, find support (browser: Chrome)=57%. in the normal transactions, and this attribute also appears as a frequent attribute of the abnormal transactions. Based on the frequent attributes from normal and abnormal transactions, analyzer 15 may identify the component with the "Server IP: 10.0.0.1" and "Location: US" attributes as causes of the abnormal behavior as these attributes are missing from the list of attributes appearing in the normal transactions.

To further isolate the attributes causing the abnormal behavior, analyzer 15 may calculate ranks for the attributes based on confidence for the rule: Abnormal→attribute, with respect to the current and historical abnormal transactions, as follows:

Confidence (Abnormal→Server IP: 10.0.01)=57%, and
Confidence (Abnormal→Location: US)=42%

Based on these confidence values, analyzer 15 may rank the attributes as follows:

Server IP: 10.0.01=Rank 1
Location: US=Rank 2

Thus, the root cause of the abnormality may be suspected by analyzer 15 to be a server with IP Address 1.0.0.1 (Rank 1). Analyzer 15 may automatically provide this information (e.g., to ITOM operators), and thus reduce the time the operators might have taken to otherwise study and resolve the application abnormality.

In example implementations, if after using one frequent item in the frequent item set, there are large numbers of entities identified as causes of the abnormality, a user can choose to reduce the number of entities to a smaller number by increasing the number of items in a frequent item set and re-running the above method Implementations of the various techniques and systems described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatuses, e.g., programmable processors or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the processing of a computer program include, by way of example, both general and special purpose microprocessors, and any one or more processors of any kind of digital computer. Generally, a processor will receive instructions and data from a read-only memory or a random-access memory or both. Elements of a computer may include at least one processor for executing instructions and one or more memory devices for storing instructions and data. Generally, a computer also may include, or be operatively coupled to receive data from or transfer data to, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a networked computer system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communications network. Examples of communications networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that the described implementations have been presented by way of example only, not limitation, and various changes in form and details may be made. Any portion of the apparatuses and/or methods described herein may be combined in any combination, except mutually exclusive combinations. The implementations described herein can include various combinations and/or sub-combinations of the functions, components and/or features of the different implementations described.

What is claimed is:

1. A method for root cause analysis of an application performance abnormality of an application in a networked computer system, the method comprising:
    collecting client transactions data for transactions conducted by clients using the application on the networked computer system, the client transactions data including transaction records that include attributes and performance metrics of each transaction;
    identifying at least one abnormal transaction from among the client transactions data based on a violation of a performance metric value of a performance metric of the performance metrics;
    aggregating a subset of the client transactions data occurring within a time window of the at least one abnormal transaction;
    filtering the subset of the client transactions data to identify a set of abnormal transactions that violate the performance metric value;
    identifying a set of frequently appearing attributes that appear in the set of abnormal transactions;
    identifying outlier attributes within the set of frequently appearing attributes by removing frequently appearing normal attributes occurring within a set of historical normal transactions data from the frequently appearing abnormal attributes; and
    identifying a root cause for the abnormal event based on a frequency of occurrence of each of the outlier attributes within an aggregated set of abnormal transactions that includes the set of abnormal transactions and a set of historical abnormal transactions.

2. The method of claim 1, wherein pinpointing a root cause event for the abnormal event includes ranking the outlier attributes based on the frequency of occurrence of each of the outlier attributes.

3. The method of claim 1, wherein collecting client transactions data for transactions conducted by clients using the application on the networked computer system includes performing statistical functions including an average on the client transactions data over a period to establish baseline metrics data.

4. The method of claim 3, further comprising: generating an abnormal metric event alert for a baseline violation by the metric.

5. The method of claim 1, including collecting client transactions data for transactions conducted by clients using the application on the networked computer system and collecting data entities having a key-value structure that includes both contextual attributes and numeric metrics.

6. The method of claim 1, wherein the performance metric value is determined based on aggregated performance metric values of the performance metric among the clients.

7. A system for root cause analysis of an application performance abnormality of an application in a networked computer system, the system comprising:
    a computing device including at least one processor and at least one memory;
    a monitor configured to collect client transactions data for transactions conducted by clients using the application on the networked computer system, the client transactions data including transaction records that include attributes and performance metrics of each transaction; and
    an analyzer configured to:
    identify at least one abnormal transaction from among the client transactions data based on a violation of a performance metric value of a performance metric of the performance metrics;
    aggregate a subset of the client transactions data occurring within a time window of the at least one abnormal transaction;
    filter the subset of the client transactions data to identify a set of abnormal transactions that violate the performance metric value;
    identify a set of frequently appearing attributes that appear in the set of abnormal transactions;
    identify outlier attributes within the set of frequently appearing attributes by removing frequently appearing normal attributes occurring within a set of historical normal transactions data from the frequently appearing abnormal attributes; and identify a root cause for the abnormal event based on a frequency of occurrence of each of the outlier attributes within an aggregated set of abnormal transactions that includes the set of abnormal transactions and a set of historical abnormal transactions.

8. The system of claim 7, wherein the analyzer is configured to rank the outlier attributes based on the frequency of occurrence of each of the outlier attributes.

9. The system of claim 7, further comprising: an aggregator configured to perform statistical functions including an average on the client transactions data over a period of normal performance to establish baseline metrics data.

10. The system of claim 9, wherein the aggregator is configured to generate an abnormal metric event alert for a baseline violation by the metric.

11. The system of claim 7, wherein collecting client transactions data for transactions conducted by clients using the application on the networked computer system includes collecting data entities having a key-value structure including both contextual attributes and numeric metrics.

12. The system of claim 7, wherein the performance metric value is determined based on aggregated performance metric values of the performance metric among the clients.

13. A computer program product including instructions recorded on a non-transitory computer-readable storage medium and configured to cause at least one processor to conduct root cause analysis of an application performance abnormality of an application in a networked computer system, the instructions when executed by the at least one processor causing the at least one processor to:

collect client transactions data for transactions conducted by clients using the application on the networked computer system, the client transactions data including transaction records that include attributes and performance metrics of each transaction;

identify at least one abnormal transaction from among the client transactions data based on a violation of a performance metric value of a performance metric of the performance metrics;

aggregate a subset of the client transactions data occurring within a time window of the at least one abnormal transaction;

filter the subset of the client transactions data to identify a set of abnormal transactions that violate the performance metric value;

identify a set of frequently appearing attributes that appear in the set of abnormal transactions;

identify outlier attributes within the set of frequently appearing attributes by removing frequently appearing normal attributes occurring within a set of historical normal transactions data from the frequently appearing abnormal attributes; and identify a root cause event for the abnormal event based on a frequency of occurrence of each of the outlier attributes within an aggregated set of abnormal transactions that includes the set of abnormal transactions and a set of historical abnormal transactions.

14. The computer program product of claim 13, wherein the instructions, when executed, cause the at least one processor to:

rank the outlier attributes based on the frequency of occurrence of each of the outlier attributes.

15. The computer program product of claim 13, wherein the instructions, when executed, cause the at least one processor to:

average the client transactions data over a period of normal performance to establish baseline metrics data.

16. The computer program product of claim 14, wherein the instructions, when executed, cause the at least one processor to:

generate an abnormal metric event alert for a baseline violation by the metric.

17. The computer program product of claim 13, wherein collecting client transactions data for transactions conducted by clients using the application on the networked computer system involves collecting data entities having a key-value structure including both contextual attributes and numeric metrics.

18. The computer program product of claim 13, wherein the performance metric value is determined based on aggregated performance metric values of the performance metric among the clients.

* * * * *